United States Patent
Ma et al.

(10) Patent No.: US 10,205,629 B2
(45) Date of Patent: Feb. 12, 2019

(54) METHOD AND DEVICE FOR TRIGGERING PROTECTION SWITCHING BY SIGNAL DEGRADE OF LINK AGGREGATION PORT

(71) Applicant: ZTE CORPORATION, Shenzhen, Guangdong (CN)

(72) Inventors: Fei Ma, Guangdong (CN); Daofeng Liu, Guangdong (CN)

(73) Assignee: ZTE Corporation (CN)

( * ) Notice: Subject to any disclaimer, the term of this patent is extended or adjusted under 35 U.S.C. 154(b) by 31 days.

(21) Appl. No.: 15/313,848

(22) PCT Filed: Sep. 15, 2014

(86) PCT No.: PCT/CN2014/086557
§ 371 (c)(1),
(2) Date: Nov. 23, 2016

(87) PCT Pub. No.: WO2015/180294
PCT Pub. Date: Dec. 3, 2015

(65) Prior Publication Data
US 2017/0207950 A1      Jul. 20, 2017

(30) Foreign Application Priority Data

May 27, 2014  (CN) .......................... 2014 1 0228837

(51) Int. Cl.
*H04L 12/24*      (2006.01)
*H04L 12/26*      (2006.01)
(Continued)

(52) U.S. Cl.
CPC ...... *H04L 41/0663* (2013.01); *H04L 41/0631* (2013.01); *H04L 43/0811* (2013.01);
(Continued)

(58) Field of Classification Search
CPC . H04L 41/0663; H04L 43/16; H04L 43/0811; H04L 41/0631; H04L 12/4641; H04L 2012/5627
See application file for complete search history.

(56) References Cited

U.S. PATENT DOCUMENTS 6,724,757 B1 *  4/2004  Zadikian ............. H04J 14/0227
                                                                 370/351
6,940,810 B1 *  9/2005  Roa-Diaz ........... H04Q 11/0478
                                                                 370/217
(Continued)

FOREIGN PATENT DOCUMENTS

CN      101340381      1/2009
CN      101378359      3/2009
(Continued)

OTHER PUBLICATIONS

International Search Report for PCT/CN2014/086557 dated Mar. 3, 2015.
(Continued)

*Primary Examiner* — Zhiren Qin
*Assistant Examiner* — Harry H Kim
(74) *Attorney, Agent, or Firm* — Calfee, Halter & Griswold LLP (57) ABSTRACT

Disclosed are a method and device for triggering protection switching by signal degrade of a link aggregation port, wherein the method includes: acquiring status information of member ports of a link aggregation port from a status register of the link aggregation port; obtaining a number value X of member ports of the link aggregation port which generate signal degrade light path attenuation according to the acquired status information of the member ports; comparing the obtained number value X with a predetermined threshold value; and when the number value X is greater than the predetermined threshold value, setting statuses of
(Continued)

all the member ports of the link aggregation port to be a signal degrade status, and notifying a virtual section layer to report fault and perform a service protection switching to a backup link.

8 Claims, 6 Drawing Sheets

(51) Int. Cl.
*H04L 12/709* (2013.01)
*H04L 12/803* (2013.01)
*H04L 12/46* (2006.01)
*H04L 12/70* (2013.01)

(52) U.S. Cl.
CPC ............ *H04L 43/16* (2013.01); *H04L 45/245* (2013.01); *H04L 47/125* (2013.01); *H04L 12/4641* (2013.01); *H04L 2012/5627* (2013.01); *Y02D 50/30* (2018.01)

(56) References Cited

U.S. PATENT DOCUMENTS

| | | | | |
|---|---|---|---|---|
| 2008/0089235 A1* | 4/2008 | Kotrla | ................. | H04L 41/0659 370/242 |
| 2010/0293408 A1* | 11/2010 | Shannon | ................. | H04L 41/08 714/4.1 |
| 2012/0188867 A1* | 7/2012 | Fiorone | ................... | H04L 45/00 370/218 |
| 2015/0236867 A1* | 8/2015 | Fujita | ................. | H04L 12/1863 370/312 |

FOREIGN PATENT DOCUMENTS

| | | |
|---|---|---|
| CN | 101554002 A | 10/2009 |
| CN | 102364892 A | 2/2012 |
| EP | 2720418 A1 | 4/2014 |
| JP | 2011228921 A | 2/2011 |
| JP | 2013192022 | 9/2013 |
| JP | 2014086840 | 5/2014 |

OTHER PUBLICATIONS

European Search Report from European Application No. 14893102.5 dated Jun. 7, 2017.

Configuring IEEE 802.3ad Link Bundling and Load Balancing Contents Cisco Systems, pp. 1-32; Feb. 8, 2011.

Cisco ASR 9000 Series Aggregation Services Router L2VPN and Ethernet Services Configuration Guide, pp. 1-376, Apr. 30, 2011, retrieved from the Internet: http:/www.cisco.com/c/en/us/td/docs/routers/asr9000/software/asr9k_r4-1/1xvpn/configuration/guide/lesc41.pdf.

Office Action from Chinese Application No. 201410228837.1 dated Aug. 1, 2018 (8 pages, including translation).

* cited by examiner

METHOD AND DEVICE FOR TRIGGERING PROTECTION SWITCHING BY SIGNAL DEGRADE OF LINK AGGREGATION PORT

CROSS-REFERENCE TO RELATED APPLICATIONS

This application is the 371 application of PCT Application No. PCT/CN2014/086557, filed Sep. 15, 2014, which is based upon and claims priority to Chinese Patent Application No. 201410228837.1, filed May 27, 2014, the entire contents of which are incorporated herein by reference.

TECHNICAL FIELD

The present disclosure relates to technical field of communication, and more particularly, to a method and device for triggering protection switching by Signal Degrade (SD) of a link aggregation port (smartgroup).

BACKGROUND

The PTN network refers to a packet transport network, which network is a connection oriented technology based on packet switching for uniformly transferring multi-service. The PTN network can not only preferably carry carrier-class Ethernet services, satisfy five bask properties, such as a service standardization, a high reliability, a flexible extensibility, a strict Quality of Service (QoS), an excellent Operation, Administration and Maintenance (OAM), and the like, but also support conventional Time Division Multiplexing (TDM) and Asynchronous Transfer Mode (ATM) services, and inherit management functions, such as a graphical interface of Synchronous Digital Hierarchy (SDH) network management, and an end-to-end configuration.

The PTN network is divided into three layers, which are respectively PIN Virtual Channel (VC) layer network, PTN Virtual Path (VP) layer network, and PTN Virtual Section (VC) layer network. The bottom layer of the PTN is a physical medium layer network, such as an optical fibre link. For MPLS-TP technology, the VC layer of the PTN is a Pseudo Wire (PW) layer, and the VP layer is a Label Switched Path (LSP) layer.

The PTN network possesses the OAM ability and network protection mechanism, and is mainly divided into an OAM module and a protection switching module. The OAM module is suitable for three layers of virtual section (TMS) layer/virtual channel (IMP) layer/virtual path (TMC) layer, detects fault by periodically sending an OAM message layering, notifies the protection switching module, then the protection switching module performs a master-backup switching, so as to achieve the protection for the service. The detection characteristics of the OAM module can realize a switched convergence of the service within 50 MS, and satisfy the switching performance requirement of the carrier-class Ethernet.

Light path attenuation phenomenon may be occurred in the physical medium (such as an optical fibre) carrying the service in the switching equipment carrying carrier-class Ethernet services, which may result in consecutive lost packets in the service traffic. The OAM nodule may detect such light path attenuation and report the fault to the TMS layer/TMP layer/TMC layer, and notify the protection switching module to perform protection switching of the service. The particular implementing procedure is as follows: when the link layer generates signal degrade, its physical medium port may be set to be a signal degrade status, and the signal degrade status is notified to the TMS layer, then the TMS layer reports the signal degrade status to the TMP layer via the OAM module, then the TMP layer may also report the status to the TMC layer, and the fault is reported layer by layer; and then the protection switching module sends a switching message with a status of signal degrade to achieve the protection switching of the service in the TMP layer or the TMC layer.

However, at present, the switching equipment carrying carrier-class Ethernet services can support the detection, notification and switching only when one physical port of the network-side output is in the signal degrade status.

This section provides background information related to the present disclosure which is not necessarily prior art.

SUMMARY

In view of the above-mentioned technical problem, the present disclosure provides a method and device for triggering protection switching by signal degrade of a link aggregation port, which can overcome the above technical problem or at least partly solve the above technical problem, so as to achieve detection, notification and switching of the signal degrade status of the link aggregation port.

According to one aspect of the present disclosure, a method for triggering protection switching by signal degrade of a link aggregation port is provided. The method includes: acquiring status information of member ports of a link aggregation port from a status register of the link aggregation port; obtaining a number value X of member ports of the link aggregation port which generate signal degrade light path attenuation (attenuation optical signal) according to the acquired status information of the member ports; comparing the obtained number value X of the member ports of the link aggregation port which generate the signal degrade light path attenuation with a predetermined threshold value; and when the number value X of the member ports of the link aggregation port which generate the signal degrade light path attenuation is greater than the predetermined threshold value, setting statuses of all the member ports of the link aggregation port to be a signal degrade status, and notifying a virtual section layer to report fault and perform a service protection switching to a backup link.

In an embodiment, before acquiring the status information of the member ports of the link aggregation port from the status register of the link aggregation port, the method further includes: determining whether a network-side output port is a link aggregation port; and when the network-side output port is the link aggregation port, performing the step of acquiring the status information of the member ports of the link aggregation port from the status register of the link aggregation port.

In an embodiment, the method further includes: when the number value X of the member ports of the link aggregation port which generate the signal degrade light path attenuation is less than or equal to the predetermined threshold value, setting statuses of X member ports which generate the signal degrade light path attenuation to be an inactive status.

In an embodiment, the step of notifying the virtual section layer to perform the service protection switching includes: reporting, by the virtual section layer, the signal degrade status to a virtual path layer or a virtual channel layer via an OAM module; and sending, by a protection switching module, a switching message with a status of signal degrade to perform the protection switching of the virtual path layer or the virtual channel layer.

In an embodiment, after the signal degrade of the member ports of the link aggregation port is cleared, the method further includes: setting statuses of all the member ports of the link aggregation port to be an active status; comparing the obtained number value X of the member ports of the link aggregation port which generate the signal degrade light path attenuation with the predetermined threshold value; and when the number value X of the member ports of the link aggregation port which generate the signal degrade light path attenuation is less than or equal to the predetermined threshold value, notifying to clear the signal degrade of the link aggregation port, and clear a signal degrade alarm of the virtual section layer, notifying, by the virtual section layer, a virtual path layer or a virtual channel layer to clear the signal degrade status, and switching the service back to a master link from the backup link.

In an embodiment, the predetermined threshold value is a difference value between a number M of the member ports of the link aggregation port and a reserved bandwidth number N of the link aggregation port.

According to another aspect of the present disclosure, a device for triggering protection switching by signal degrade of a link aggregation port is also provided. The device includes:

a first acquiring module configured to acquire status information of member ports of a link aggregation port from a status register of the link aggregation port; a second acquiring module configured to obtain a number value X of member ports of the link aggregation port which generate signal degrade light path attenuation according to the acquired status information of the member ports; a comparing module configured to compare the obtained number value X of the member ports of the link aggregation port which generate the signal degrade light path attenuation with a predetermined threshold value; and a protection switching triggering module configured to, when the number value X of the member ports of the link aggregation port which generate the signal degrade light path attenuation is greater than the predetermined threshold value, set statuses of all the member ports of the link aggregation port to be a signal degrade status, and notify a virtual section layer to report fault and perform a service protection switching to a backup link.

In an embodiment, the device further includes: a determining module configured to determine whether a network-side output port is a link aggregation port; and when the network-side output port is the link aggregation port, trigger the first acquiring module.

In an embodiment, the device further includes: a status setting module configured to, when the number value X of the member ports of the link aggregation port which generate the signal degrade light path attenuation is less than or equal to the predetermined threshold value, set statuses of X member ports which generate the signal degrade light path attenuation to be an inactive status.

In an embodiment, the status setting module is further configured to set statuses of all the member ports of the link aggregation port to be an active status after the signal degrade of the member ports of the link aggregation port is cleared; the comparing module is further configured to compare the obtained number value X of the member ports of the link aggregation port which generate the signal degrade light path attenuation with the predetermined threshold value; and the device further includes: a switch-back triggering module configured to, when the number value X of the member ports of the link aggregation port which generate the signal degrade light path attenuation is less than or equal to the predetermined threshold value, notify to clear the signal degrade of the link aggregation port, and clear a signal degrade alarm of the virtual section layer, notify, by the virtual section layer, a virtual path layer or a virtual channel layer to clear the signal degrade status, and switch the service back to a master link from the backup link.

In an embodiment, the predetermined threshold value is a difference value between a number M of the member ports of the link aggregation port and a reserved bandwidth number N of the link aggregation port.

The advantageous effects of the present disclosure include: when the number value X of the member ports of the link aggregation port which generate signal degrade light path attenuation is greater than the predetermined threshold value, statuses of all the member ports of the link aggregation port are set to be a signal degrade status, and a virtual section layer is notified to report fault and perform a service protection switching to a backup link; in this way, the protection switching-back of the service is achieved when SD light attenuation is occurred on the Ethernet service outlet which is a link aggregation port, and the carrier-class switching performance is ensured.

This section provides a summary of various implementations or examples of the technology described in the disclosure, and is not a comprehensive disclosure of the full scope or all features of the disclosed technology.

DETAILED DESCRIPTION

Hereinafter, exemplary embodiments of the present disclosure would be explained in detail with reference to the drawings. Although the drawings show the exemplary embodiments of the present disclosure, it should be understood that the present disclosure may be implemented in various forms, and should not be restricted by the embodiments explained herein. On the contrary, these embodiments are provided for thoroughly understanding the present disclosure, and completely transferring the scope of the present disclosure to the person skilled in the art.

The embodiments of the present disclosure may be applied in the switching equipment supporting carrier-class Ethernet services in the PTN network, and applied in a scene in which the master link network-side outlet in the Ethernet service is a link aggregation port. It should be understood that, the executive body of individual steps in the following method is not limited by the embodiments of the present disclosure.

Figure 1:
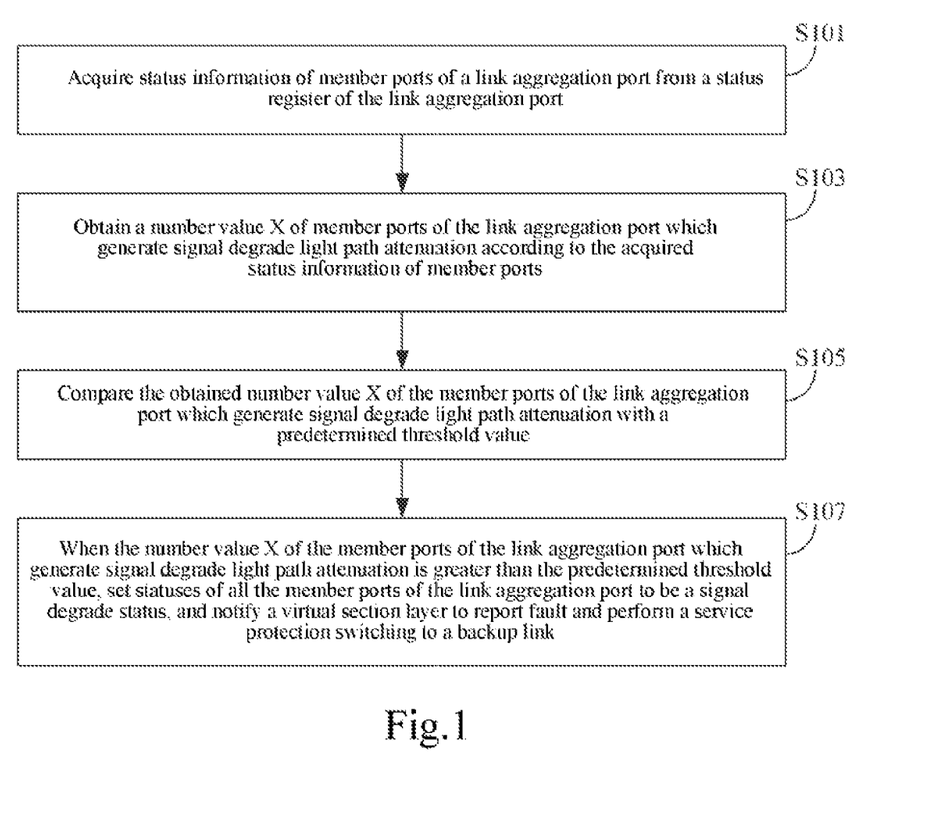
FIG. 1 is a first flow chart of a method for triggering protection switching by signal degrade of a link aggregation port in embodiments of the present disclosure.

FIG. 1 is a first flow chart of a method for triggering protection switching by signal degrade of a link aggregation port in embodiments of the present disclosure. As shown in FIG. 1, the particular steps are as follows.

In step S101, status information of member ports of a link aggregation port is acquired from a status register of the link aggregation port.

In the embodiments of the present disclosure, it is possible to set a status register for the link aggregation port for recording statuses of member ports, such as a SD status, a SF (Signal Fail) status, an UP status and a DOWN status, and the switching of the port statuses may also be recorded in the status register. In addition, an inquiring machine may be provided for inquiring the statuses of the member ports in the link aggregation port according to a predetermined time (such as per second), and writing the inquired results into the status register. When a member is newly added into or removed from the link aggregation port, the inquiring machine is zero cleared and reset; and when the UP status and the DOWN status in the statuses of the member ports change, the inquiring machine is zero cleared and reset.

In step S103, a number value X of member ports of the link aggregation port which generate signal degrade light path attenuation is obtained according to the acquired status information of the member ports.

In particular, a statistics is performed on the number of the member ports in the link aggregation port which generate signal degrade light path attenuation within the status register, so as to obtain the number value X.

In step S105, the obtained number value X of the member ports of the link aggregation port which generate signal degrade light path attenuation is compared with a predetermined threshold value.

Alternatively, the predetermined threshold value is a difference value between the number M of the member ports in the link aggregation port and a reserved bandwidth number N of the link aggregation port.

In step S107, when the number value X of the member ports of the link aggregation port which generate signal degrade light path attenuation is greater than the predetermined threshold value, statuses of all the member ports of the link aggregation port are set to be a signal degrade status, and a TMS layer is notified to report fault and perform a service protection switching to a backup link.

In the embodiments of the present disclosure, the VC layer is called as a TMC layer, the VP layer is called as a TMP layer, the VS layer is called as a TMS layer, and the physical medium layer is called as a link layer. The four-layer structure is the link layer/the TMS layer/the TMP layer/the TMC layer in turn from the bottom layer.

In particular, in the embodiments of the present disclosure, the TMS layer reports a signal degrade status to the TMP layer or the TMC layer via the OAM module, and the protection switching module sends a switching message having a status of signal degrade so as to perform a protection switching on the TMP layer or the TMC layer.

In the embodiments of the present disclosure, through the above steps S101-S107, the protection switching of the service is achieved when the signal degrade light path attenuation is occurred on the Ethernet service outlet which is the link aggregation port, and the carrier-class switching performance is ensured.

Figure 2:
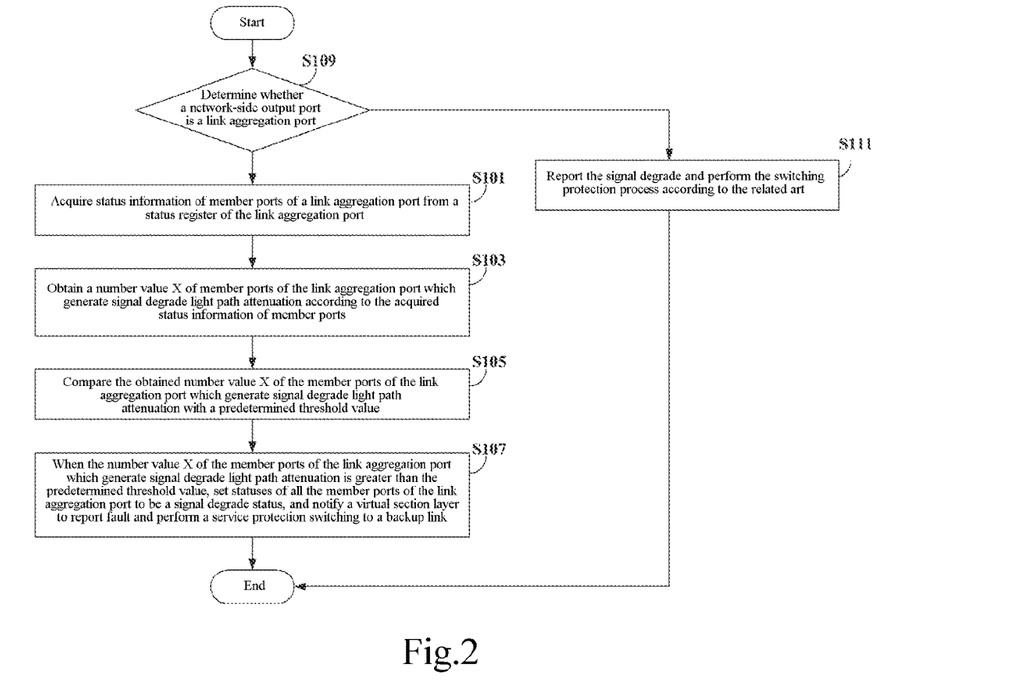
FIG. 2 is a second flow chart of a method for triggering protection switching by signal degrade of a link aggregation port in the embodiments of the present disclosure.

FIG. 2 is a second flow chart of a method for triggering protection switching by signal degrade of a link aggregation port in the embodiments of the present disclosure. As shown in FIG. 2, different from the method shown in FIG. 1, before the step S101, the method further includes the following step.

In step S109, it is determined whether a network-side output port is a link aggregation port; if the network-side output port is the link aggregation port, the step S101 is entered; and if the network-side output port is a physical port, step S111 is entered. In the step S111, the signal degrade is reported and the switching protection process is performed according to the related art, which is not elaborated herein.

Figure 3:
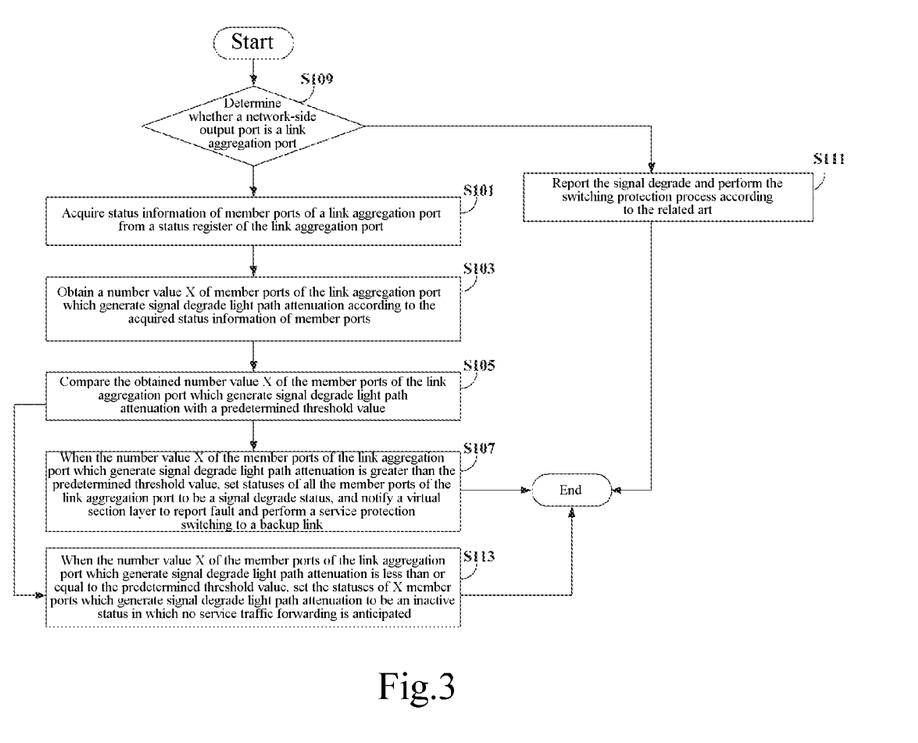
FIG. 3 is a third flow chart of a method for triggering protection switching by signal degrade of a link aggregation port in the embodiments of the present disclosure.

FIG. 3 is a third flow chart of a method for triggering protection switching by signal degrade of a link aggregation port in the embodiments of the present disclosure. As shown in FIG. 3, different from the method shown in FIG. 2, after the step S105, the method further includes the following step.

In step S113, when the number value X of the member ports of the link aggregation port which generate signal degrade light path attenuation is greater than zero and less than or equal to the predetermined threshold value, the statuses of X member ports which generate signal degrade light path attenuation are set to be an inactive status.

During implementation of the present disclosure, the following three exceptional conditions are considered. In the first condition, if M=N, i.e., when M−N=0, and a value of X is 1, then the port status of the link aggregation port is set to be the signal degrade status, and the TMS layer is notified to perform the service protection switching. In the second condition, when X=0, i.e., there is no signal degrade exception, the forwarding of the link aggregation port is performed in a normal traffic. In the third condition, when the signal degrade light attenuation of the member ports which generate the signal degrade disappears, these member ports are no longer reset to be the UP status, and no longer anticipate the forwarding of the link aggregation port, due to the following reasons: if the member port in the link aggregation port newly becomes the UP status and anticipates calculation again, the traffic of the service may be influenced, and packet loss of the service may be occurred due to the recalculation. Therefore, before applying this technology, it is necessary to consider the setting of a value of the bandwidth N.

Figure 4:
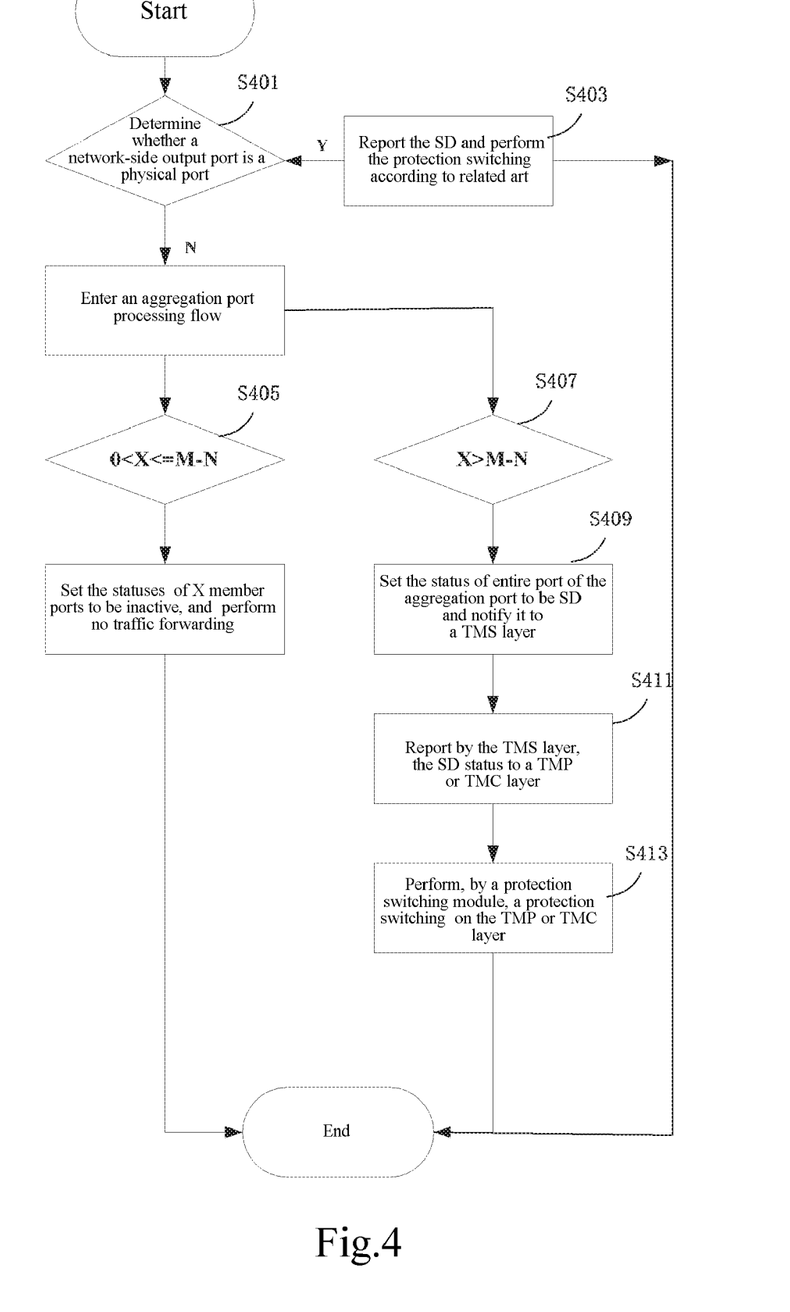
FIG. 4 is a fourth flow chart of a method for triggering protection switching by signal degrade of a link aggregation port in the embodiments of the present disclosure.

Hereinafter, the flow chart of triggering protection switching by signal degrade of a link aggregation port in the embodiments of the present disclosure will be introduced in detail in combination with FIG. 4. The particular steps are as follows.

In step S401, a port type of a network-side outlet of the Ethernet service is determined.

In step S403, if the network-side outlet is a normal physical port, OAM detection is performed according to the existing technology, and when a fault is detected, the protection switching module is notified to perform the protection switching-back of the service.

In step S405, if the network-side outlet is a link aggregation port, status information of member ports is acquired from a status register of the aggregation port, and when a number value X of the member ports which generate SD light attenuation satisfies 0<X≤M−N, statuses of X member ports are set to be an inactive status, and traffic forwarding is not performed.

In step S407, when the number value X of the member ports which generate SD light attenuation satisfies X>M−N, a status of entire port of the aggregation port is set to be a SD status and the SD status is notified to a TMS layer.

In step S409, the TMS layer reports the SD status to a IMP or TMC layer, and the protection switching module performs the protection switching on the TMP or TMC layer.

In step S411, after the SD light attenuation of the member ports is cleared, the aggregation port resets its status to be active, and when the condition of 0<X≤M−N is satisfied again, the SD status of the aggregation port is cleared.

In step S413, the SD status of the aggregation port is cleared, a SD alarm of the TMS layer is cleared, and the TMP or TMC layer is notified to perform the protection switching-back of the service.

In the embodiments of the present disclosure, through the above steps S401-S411, the protection switching-back of the service is achieved when the SD light path attenuation is occurred on the Ethernet service outlet which is the link aggregation port, and the carrier-class switching performance is ensured.

Figure 5:
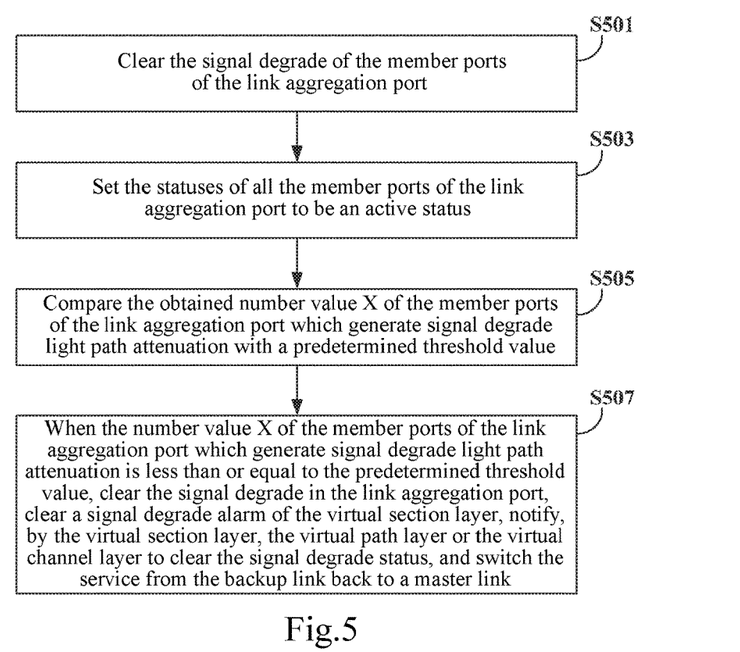
FIG. 5 is a first flow chart of service switching-back in the embodiments of the present disclosure.

FIG. 5 is a first flow chart of service switching-back in embodiments of the present disclosure. As shown in FIG. 5, the particular steps are as follows.

In step S501, the signal degrade of the member ports of the link aggregation port is cleared.

In step S503, the statuses of all the member ports of the link aggregation port are set to be an active status.

In step S505, the obtained number value X of the member ports of the link aggregation port which generate signal degrade light path attenuation is compared with a predetermined threshold value.

In step S507, when the number value X of the member ports of the link aggregation port which generate signal degrade light path attenuation is less than or equal to the predetermined threshold value, the signal degrade in the link aggregation port is cleared, a signal degrade alarm of the TMS layer is cleared, the TMS layer notifies the TMP layer or the TMC layer to clear the signal degrade status, and the service is switched-back from the backup link to a master link.

Figure 6:
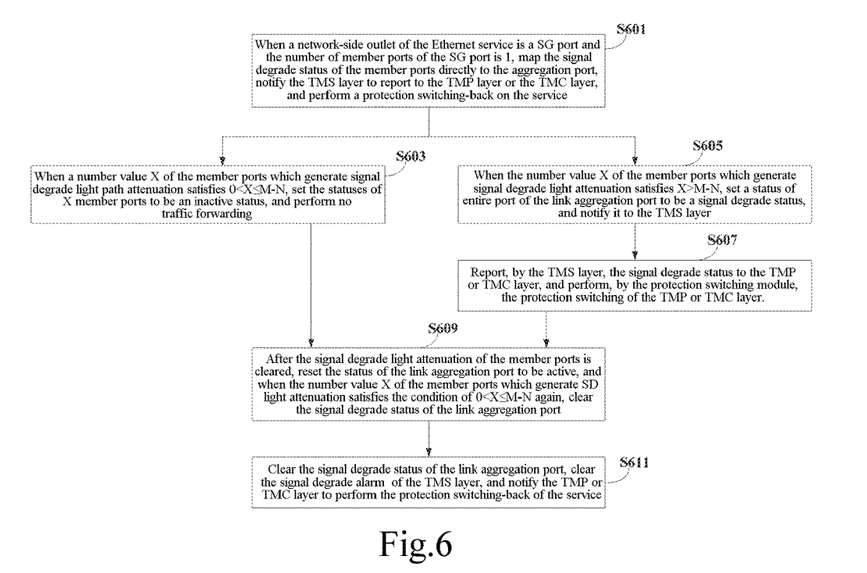
FIG. 6 is a second flow chart of service switching-back in the embodiments of the present disclosure.

FIG. 6 is a second flow chart of service switching-back in the embodiments of the present disclosure. As shown in FIG. 6, the particular steps are as follows.

In step S601, when a network-side outlet of the Ethernet service is a SG (smartgroup) port and the number of its member ports is 1, the signal degrade status of the member ports is directly mapped to the aggregation port, the TMS layer is notified to report to the TMP layer or the TMC layer, and perform a protection switching-back on the service.

In step S603, when a number value X of the member ports which generate SD light path attenuation satisfies 0<X≤M−N, statuses of X member ports are set to be an inactive status, and traffic forwarding is not performed; wherein M indicates a number of the member ports in the link aggregation port, and N indicates a number of reserved bandwidth of the link aggregation port.

In step S605, when the number value X of the member ports which generate SD light path attenuation satisfies X>M−N, a status of entire port of the link aggregation port is set to be a signal degrade status and the signal degrade status is notified to the TMS layer.

In step S607, the TMS layer reports the signal degrade status to the TMP layer or the TMC layer, and the protection switching module performs the protection switching on the TMP or TMC layer.

In step S609, after the signal degrade light attenuation of the member ports is cleared, the link aggregation port resets its status to be an active status, and when the number value X of the member ports which generate SD light attenuation satisfies the condition of 0<X≤M−N again, the signal degrade status of the link aggregation port is cleared.

In step S611, the signal degrade status of the link aggregation port is cleared, a signal degrade alarm of the TMS layer is cleared, and the TMP layer or the TMC layer is notified to perform the protection switching-back on the service.

Figure 7:
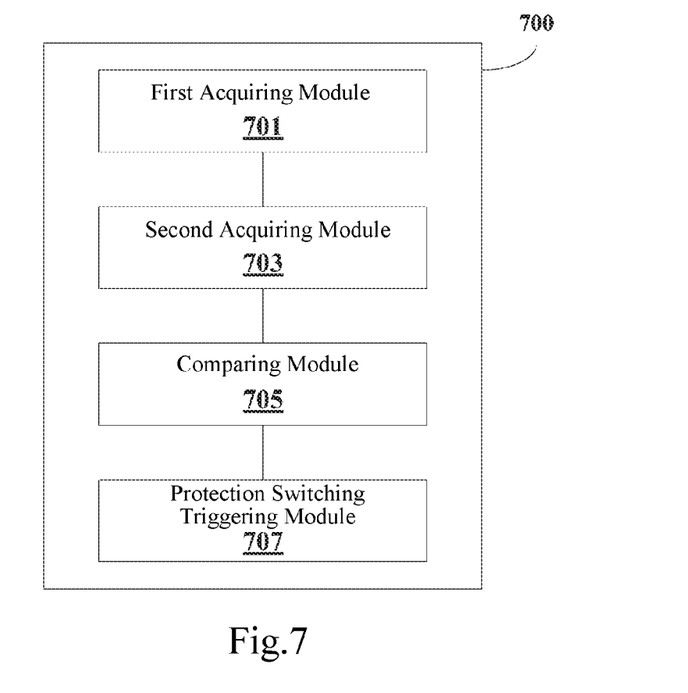
FIG. 7 is a block diagram of a device for triggering protection switching by signal degrade of a link aggregation port in embodiments of the present disclosure.

According to another aspect of the embodiments of the present disclosure, a device for triggering protection switching by signal degrade of a link aggregation port is provided. As shown in FIG. 7, the device 700 includes: a first acquiring module 701, a second acquiring module 703, a comparing module 705, and a protection switching triggering module 707.

The first acquiring module 701 is configured to acquire status information of member ports of a link aggregation port from a status register of the link aggregation port.

The second acquiring module 703 is configured to obtain a number value X of member ports of the link aggregation port which generate signal degrade light path attenuation according to the acquired status information of the member ports.

The comparing module 705 is configured to compare the obtained number value X of the member ports of the link aggregation port which generate signal degrade light path attenuation with a predetermined threshold value.

The protection switching triggering module 707 is configured to, when the number value X of the member ports of the link aggregation port which generate signal degrade light path attenuation is greater than the predetermined threshold value, set statuses of all the member ports of the link aggregation port to be a signal degrade status, and notify a virtual section layer to report fault and perform a service protection switching to a backup link, wherein the predetermined threshold value is a difference value between the number M of the member ports in the link aggregation port and a reserved bandwidth number N of the link aggregation port.

Alternatively, in another embodiment of the present disclosure, the device 700 further includes a determining module.

The determining module is configured to determine whether a network-side output port is a link aggregation port; and when the network-side output port is the link aggregation port, trigger the first acquiring module.

Alternatively, in another embodiment of the present disclosure, the device 700 further includes a status setting module.

The status setting module is configured to, when the number value X of the member ports of the link aggregation port which generate signal degrade light path attenuation is less than or equal to the predetermined threshold value, set statuses of X member ports which generate signal degrade light path attenuation to be an inactive status.

Alternatively, in another embodiment of the present disclosure, the status setting module is further configured to set statuses of all the member ports of the link aggregation port to be an active status after the signal degrade of the member ports of the link aggregation port is cleared.

The comparing module is further configured to compare the obtained number value X of the member ports of the link aggregation port which generate signal degrade light path attenuation with a predetermined threshold value.

The device 700 further includes a switching-back triggering module.

The switching-back triggering module is configured to, when the number value X of the member ports of the link aggregation port which generate signal degrade light path attenuation is less than or equal to the predetermined threshold value, notify to clear the signal degrade of the link aggregation port, and clear a signal degrade alarm of the virtual section layer, notify, by the virtual section layer, a virtual path layer or a virtual channel layer to clear the signal degrade status, and switch the service back to a master link from the backup link.

The above contents are preferred embodiments of the present disclosure. It should be noted that for the person skilled in the art, it is possible to make several modifications and polishes without departing from the principle of the present disclosure, and these modifications and polishes also fall within the protection scope of the present disclosure.

INDUSTRIAL APPLICABILITY

As mentioned above, through the above embodiments and preferred implementations, the protection switching-back of the service is achieved when the SD light attenuation is occurred on the Ethernet service outlet which is a link aggregation port, and the carrier-class switching performance is ensured.

What is claimed is:

1. A method for triggering protection switching by signal degradation of a link aggregation group, comprising:
    determining a configuration whether a network-side output port is a link aggregation group;
    acquiring status information of member ports of the link aggregation group from a status register of the link aggregation group based on the determined configuration;
    obtaining X member ports of the link aggregation group which generate light path attenuation for the signal degradation according to the acquired status information of the member ports;
    comparing the obtained number value X of the member ports of the link aggregation group which generate the light path attenuation for the signal degradation with a predetermined threshold value;
    when the number value X of the member ports of the link aggregation group which generate the light path attenuation for the signal degradation is greater than the predetermined threshold value,
    setting status of all the member ports of the link aggregation group to a signal degraded status,
    notifying a virtual section layer to report fault, and
    performing a service protection switching to a backup link; and
    when the number value X of the member ports of the link aggregation group which generate the light path attenuation for the signal degradation is less than or equal to the predetermined threshold value,
    setting status of the X member ports which generate the light path attenuation for the signal degradation to an inactive status.

2. The method according to claim 1, wherein the step of notifying the virtual section layer and performing the service protection switching comprises: reporting, by the virtual section layer, the signal degraded status to a virtual path layer or a virtual channel layer via an Administration and Maintenance OAM module; and sending, by a protection switching module, a switching message with a status of signal degradation to perform the protection switching of the virtual path layer or the virtual channel layer.

3. The method according to claim 1, wherein after the signal degradation of the member ports of the link aggregation group is cleared, the method further comprises:
    setting status of all the member ports of the link aggregation group to an active status;
    comparing the obtained number value X of the member ports of the link aggregation group which generate the light path attenuation for the signal degradation with the predetermined threshold value; and
    when the number value X of the member ports of the link aggregation group which generate the light path attenuation for the signal degradation is less than or equal to the predetermined threshold value, notifying to clear the signal degradation of the link aggregation group, and clear a signal degradation alarm of the virtual section layer, notifying, by the virtual section layer, a virtual path layer or a virtual channel layer to clear the signal degraded status, and switching the service back to a master link from the backup link.

4. The method according to claim 1, wherein the predetermined threshold value is a difference value between a number M of the member ports of the link aggregation group and a reserved bandwidth number N of the link aggregation group.

5. A device for triggering protection switching by signal degradation of a link aggregation group, comprising: a processor; and a memory for storing instructions executable by the processor; wherein the processor is configured to:
    determine a configuration whether a network-side output port is a link aggregation group;
    acquire status information of member ports of the link aggregation group from a status register of the link aggregation group based on the determined configuration;
    obtain X member ports of the link aggregation group which generate light path attenuation for the signal degradation according to the acquired status information of the member ports;
    compare the obtained number value X of the member ports of the link aggregation group which generate light path attenuation for the signal degradation with a predetermined threshold value;
    when the number value X of the member ports of the link aggregation group which generate light path attenuation for the signal degradation is greater than the predetermined threshold value,
    set status of all the member ports of the link aggregation group to a signal degraded status,
    notify a virtual section layer to report fault, and
    perform a service protection switching to a backup link; and
    when the number value X of the member ports of the link aggregation group which generate the light path attenuation for the signal degradation is less than or equal to the predetermined threshold value,
    set status of the X member ports which generate the light path attenuation for the signal degradation to an inactive status.

6. The device according to claim 5, wherein the processor is further configured to set status of all the member ports of the link aggregation group to an active status after the signal degradation of the member ports of the link aggregation group is cleared;
    the processor is further configured to compare the obtained number value X of the member ports of the link aggregation group which generate the light path attenuation for the signal degradation with the predetermined threshold value; and the processor is further configured to:

when the number value X of the member ports of the link aggregation group which generate the light path attenuation for the signal degradation is less than or equal to the predetermined threshold value, notify to clear the signal degradation of the link aggregation group, and clear a signal degradation alarm of the virtual section layer, notify, by the virtual section layer, a virtual path layer or a virtual channel layer to clear the signal degraded status, and switch the service back to a master link from the backup link.

7. The device according to claim 5, wherein the predetermined threshold value is a difference value between a number M of the member ports of the link aggregation group and a reserved bandwidth number N of the link aggregation group.

8. A computer storage medium, wherein the computer storage medium is stored with a computer-executable instruction, and the computer-executable instruction is configured to:

determine a configuration whether a network-side output port is a link aggregation group;

acquire status information of member ports of the link aggregation group from a status register of the link aggregation group;

obtain X member ports of the link aggregation group which generate light path attenuation for the signal degradation according to the acquired status information of the member ports;

compare the obtained number value X of the member ports of the link aggregation group which generate light path attenuation for the signal degradation with a predetermined threshold value; and when the number value X of the member ports of the link aggregation group which generate light path attenuation for the signal degradation is greater than for the predetermined threshold value, set status of all the member ports of the link aggregation group to a signal degraded status, notify a virtual section layer fault, and perform a service protection switching to a backup link; and when the number value X of the member ports of the link aggregation group which generate the light path attenuation for the signal degradation is less than or equal to the predetermined threshold value, set status of the X member ports which generate the light path attenuation for the signal degradation to an inactive status.

* * * * *